United States Patent
Storm et al.

(10) Patent No.: US 6,895,033 B1
(45) Date of Patent: May 17, 2005

(54) METHOD AND APPARATUS FOR CALL RECOVERY AFTER A POWER CUT FOR A CDMA CELLULAR PHONE

(75) Inventors: Brian Storm, Round Lake Beach, IL (US); Scott Alan Steele, Lindenhurst, IL (US); Jeremy Jacobson, Crystal Lake, IL (US); Richard Koss, Oak Creek, WI (US); William P. Alberth, Jr., Crystal Lake, IL (US); Sabrina Bahadori, Chicago, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 09/537,130

(22) Filed: Mar. 29, 2000

(51) Int. Cl.[7] .................................................. H04B 1/69
(52) U.S. Cl. ........................................ 375/130; 375/343
(58) Field of Search ................................ 375/130, 139, 375/142, 143, 150, 152, 343, 355, 145, 149; 370/320, 335, 342; 455/436

(56) References Cited

U.S. PATENT DOCUMENTS

| | | | |
|---|---|---|---|
| 4,772,852 A | * 9/1988 | Viti | ................................ 327/7 |
| 5,036,532 A | 7/1991 | Metroka et al. | |
| 5,452,417 A | * 9/1995 | Randall et al. | .............. 345/501 |
| 5,491,718 A | 2/1996 | Gould et al. | |
| 5,748,687 A | 5/1998 | Ozluturk | |
| 6,005,844 A | * 12/1999 | Ono et al. | ................... 370/253 |
| 6,542,492 B1 | * 4/2003 | Tran et al. | ................... 370/342 |

* cited by examiner

Primary Examiner—Young T. Tse
(74) Attorney, Agent, or Firm—Lalita P. Williams; Roland K. Bowler, II; David S. Noskowicz (57) ABSTRACT

A first sequence state storage module (20) periodically stores a present state (22) of a long code generator (30). Following a restoration of power after a power cut condition, or following the termination of any other interruption of the generation of the long code, a sequence recovery module (50) then provides an updated present state (36). The updated present state (36) is based upon a stored present state (24) and a time value (52) that is reset whenever the present state (22) of the long code or other sequence is stored and that is available even when the long code or other sequence is interrupted.

17 Claims, 4 Drawing Sheets

METHOD AND APPARATUS FOR CALL RECOVERY AFTER A POWER CUT FOR A CDMA CELLULAR PHONE

FIELD OF THE INVENTION

The invention relates generally to wireless devices and more particularly to synchronization of codes exchanged among wireless devices.

BACKGROUND OF THE INVENTION

Many wireless devices, such as cellular telephones, communicate with a base station by using spread spectrum techniques. When using this technique, each underlying information bit is "spread" by one or more digital sequences operating at a higher bit rate than the information itself, resulting in a wider spectrum than would normally be required to transmit the underlying information. By carefully selecting these sequences or codes, multiple users can utilize the same communication channel simultaneously with little or no interference. This technique is called Code Division Multiple Access or CDMA. These spreading sequences have a number of purposes, including privacy, orthogonalization and interference mitigation.

In order to communicate between two devices using spread spectrum, the sequences must be synchronized at both ends of the link. Synchronization of the link can be a multi-step process, which takes an extended period of time to complete.

In addition to the typical communication components, a CDMA device also contains a correlator, used for despreading the received signal and one or more spreading sequence or pseudo-random number (PN) generators. It is these generators that are synchronized with the source of the received signal using code search methods and/or information sent over the air.

A power cut is an unpredicted interruption in power to a cellular phone that can be caused by events such as bouncing battery contacts. If the cellular subscriber unit is in a phone call, a power cut would cause the phone call to be interrupted.

Motorola has previously shipped phones capable of recovering a phone call after a power cut, such as the MicroTAC II for the NTACS system. At the beginning of a phone call, slowly changing or static information necessary to support the call is stored in non-volatile memory. For the NTACS system this information may include such items as RF carrier channel number, color codes, SAT codes, etc. When circuitry in the subscriber unit detects a power cut, the microprocessor recovers the information from memory and re-establishes the phone call.

It is desirable to extend the ability to recover a call after a power cut to the IS-95 CDMA system. At the beginning of a CDMA phone call, the subscriber unit will store information about the call in non-volatile memory. This information will typically include for example, such items as RF carrier channel and long code PN offset. Circuitry in the subscriber unit can detect that a power cut has occurred and initiate an attempt to re-establish the phone call. However, the call cannot be re-established until the subscriber set resynchronizes its internal pseudo-random number generators with those of the base station. Unfortunately, this may take several seconds to accomplish. After approximately 5 seconds of inactivity, the base station will terminate the phone call.

Consequently, there exists a need for a method and apparatus for enabling a wireless device to quickly recover synchronization after a loss of power.

DETAILED DESCRIPTION OF THE PREFERRED EMBODIMENT

Generally stated, the disclosed communication unit includes a nonvolatile storage element in which the communication unit stores synchronization code states. The communication unit also measures elapsed time after an interruption in the synchronization code generation. When power is interrupted, the communication unit begins measuring time in units of a real-time clock powered by a nonvolatile power source such as a capacitor or battery.

If power is restored within a brief time, the communication unit calculates a value for a pseudo-random number generator and loads the calculated value into the pseudo-random number generator, without having to advance the pseudorandom number generator through intervening states.

Figure 1:
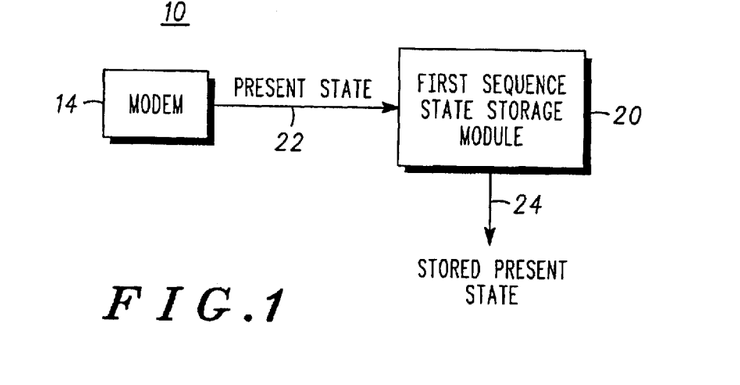
FIG. 1 is a block diagram illustrating a portion of a communication unit according to one embodiment of the present invention.

FIG. 1 shows a communication unit 10 according to one embodiment of the present invention. The communication unit 10 includes a first sequence state storage module 20. The first sequence state storage module 20 is a nonvolatile memory, such as an SRAM powered by a backup power supply. Those skilled in the art will recognize other nonvolatile storage devices and power supplies upon review of this description. The backup power supply may be a battery, a capacitor, or other energy storage device that can operate for a few seconds even after the primary sources of power to the communication unit have been disconnected.

The first sequence state storage module 20 is operably coupled to receive a present state 22 of a pseudo-random number generator from a modem 14 of a wireless device. In operation, the present state 22 of the pseudorandom number generator is frequently and periodically stored in the first sequence state storage module 20. Accordingly, the state that is stored in the first sequence state storage module 20 is never older than the most recent storing event.

In one embodiment, the pseudo-random number generator is a 41-bit shift register and several exclusive-OR gates. The shift register contains an ordered set of bits that define the pseudo-random number state. Each bit resides within a sample-and-hold flip-flop. The shift register advances to a next state in response to each clock cycle. In other words, a present state of the shift register depends on an immediately previous state. The shift register includes an input and an output. The input receives a bit upon each shift register clock cycle. The exclusive-OR gates generate the bit received at the input. The exclusive-OR gates are coupled to receive various other bits from the shift register.

The n-bit number within the shift register identifies the state of an n-bit pseudo-random number generator. An n-bit pseudo-random number generator cycles through m possible states (where m is any number between 1 and $2^n$), achieving a new state in a sequence in response to each clock cycle. However, the n-bit pseudo-random number generator differs from an n-bit counter by producing states in a non-sequential order. The numbers can appear to be randomly generated.

The numbers may appear to be randomly generated but they are in fact deterministic. In IS-95, a 41-bit PN (pseudo-random number) sequence is referred to as a long code. The long code is masked by a PN offset determined by the base station the subscriber unit is communicating with. At a given time this masked long code will have a state M. At a future time, the masked long code will have a known future state M+n. This future state M+n can be calculated given the masked long code M, and the number of iterations of the PN generator n. The method of calculating future states of PN sequences is well known in the art, and is a requirement for performing IS-95 CDMA call processing. Information about how to calculate future states of PN sequences may be found in texts dealing with linear sequences such as *Spread Spectrum Communications* by Simon et. al.

Because the pseudo-random number sequence has a 41-bit state, cycling through all of the states before repeating a state can take several weeks. The long code may have up to $2^{41}$ states, each of which has 41 bits. Each base station transmits the long code to all of the cellular telephones within a given geographical area. Transmitting the entire long code may take several weeks, and then the base station begins repeating the entire long code again.

While all base stations transmit the long code, each base station does so slightly differently. Each base station transmits the long code, but introduces a delay with respect to the system time. Introducing such a delay is referred to as "masking" the long code. To mask the long code, all of the base stations within a given geographical area initial synchronize clocks with the other base stations in the geographical area. The base stations within the geographic area all share a common long code clock that defines a system time. After synchronizing the clocks to the system time, each base station then introduces a delay that is unequal to the delay introduced by any other base station within the geographical area.

Each base station within a given geographical radius has a PN offset that is unique to that base station. The PN offset may be, for example, a 35-bit number. The amount of delay introduced by a particular base station is a multiple of the "chip time," which is generally the amount of time a base station needs to transmit 64 long code states, each of which is 41 bits long. Because the long code can have up to 2 states, the time necessary to transmit the entire long code may be divided into 2 different phases. The $2^{35}$ different phases, each having a delay corresponding to the time required to transmit 64 states, completely spans the time necessary to transmit the long code.

Each base station therefore transmits a version of the long code that is shifted in time by a different multiple of the chip time. The PN offset represents the number of chip times by which a particular base station delays transmission of the long code. The cellular telephone receives the long code offset when the cellular telephone enters a cell or powers on, and stores the PN offset in a nonvolatile portion of memory.

The output of the shift register provides a sequence of bits. Upon each clock cycle, the output provides an additional bit in the sequence. As shown in FIG. 1, the first sequence state storage module 20 is operative to receive the present state 22 of the pseudo-random number generator's shift register. In one embodiment, the first sequence is a CDMA long code. Periodically, a state represented by the bits of the shift register repeats; the ordered set of bits within the shift register is identical to a previous ordered set of bits within the shift register. This repetition is referred to as "roll over."

FIG. 1 also shows the first sequence state storage module 20 providing a stored present state 24. The stored present state 24 may be retrieved from the first sequence state storage module 20 at any time. For example, the stored present state 24 may be retrieved from the first sequence state storage module 20 upon resumption of normal operation after, for example, a temporary loss of power.

Figure 2:
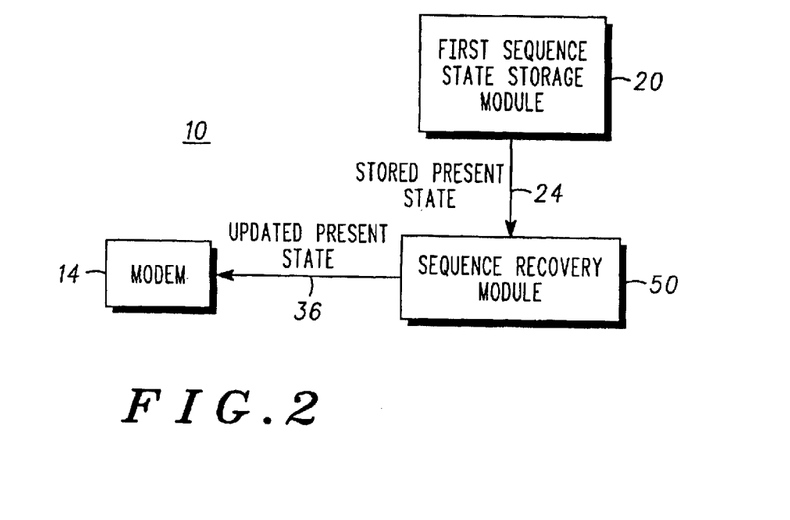
FIG. 2 is a block diagram illustrating an example of the communication unit of FIG. 1 showing additional parts of the communication unit.

FIG. 2 shows a sequence recovery module 50 recovering the stored present state 24 from the first sequence state storage module 20. The sequence recovery module 50 is able to periodically store a present state of the pseudo-random number generator. The sequence recovery module 50 is coupled to receive the stored present state 24 from the first sequence state storage module 20. The sequence recovery module 50 includes software that determines an updated present state 36 based upon the stored present state 24. In other words, the sequence recovery module 50 provides a "bridge" across a temporary loss of power, allowing the communication unit to recover from a temporary interruption by using a state of the pseudorandom number generator that was determined before the temporary loss of power.

The sequence recovery module 50 provides the updated present state 36 to the modem 14 when the pseudorandom number generator resumes normal operation following an interruption in operation. In other words, when the interruption is terminated, the sequence recovery module 50 recovers the stored present state 24.

Figure 3:
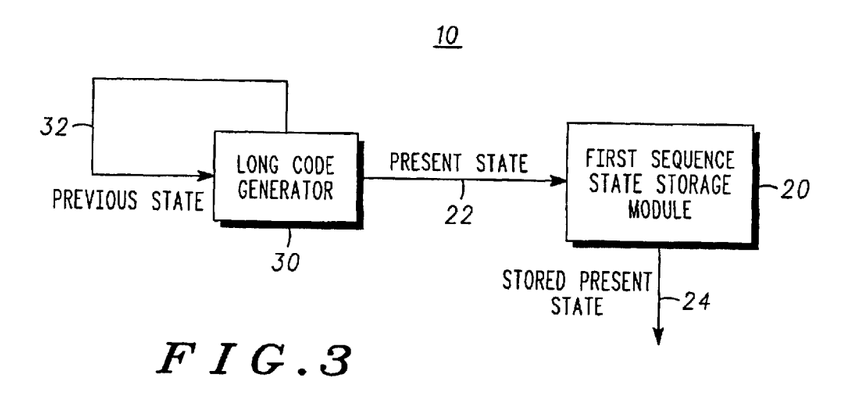
FIG. 3 is a block diagram illustrating another example portion of the communication unit of FIG. 1.

FIG. 3 is a portion of the communication unit of FIG. 1 showing a long code generator 30. The long code generator 30 is a pseudo-random number generator that generates a long code or other time-synchronized encryption sequence, and therefore has a present state 22 that is based upon a previous state 32.

The first sequence state storage module 20 obtains the present state 22 of the long code generator 30, residing within the modem 14. The first sequence state storage module 20 stores the present state 22 of the long code generator 30 periodically and then provides the stored present state 24 when requested to do so.

Figure 4:
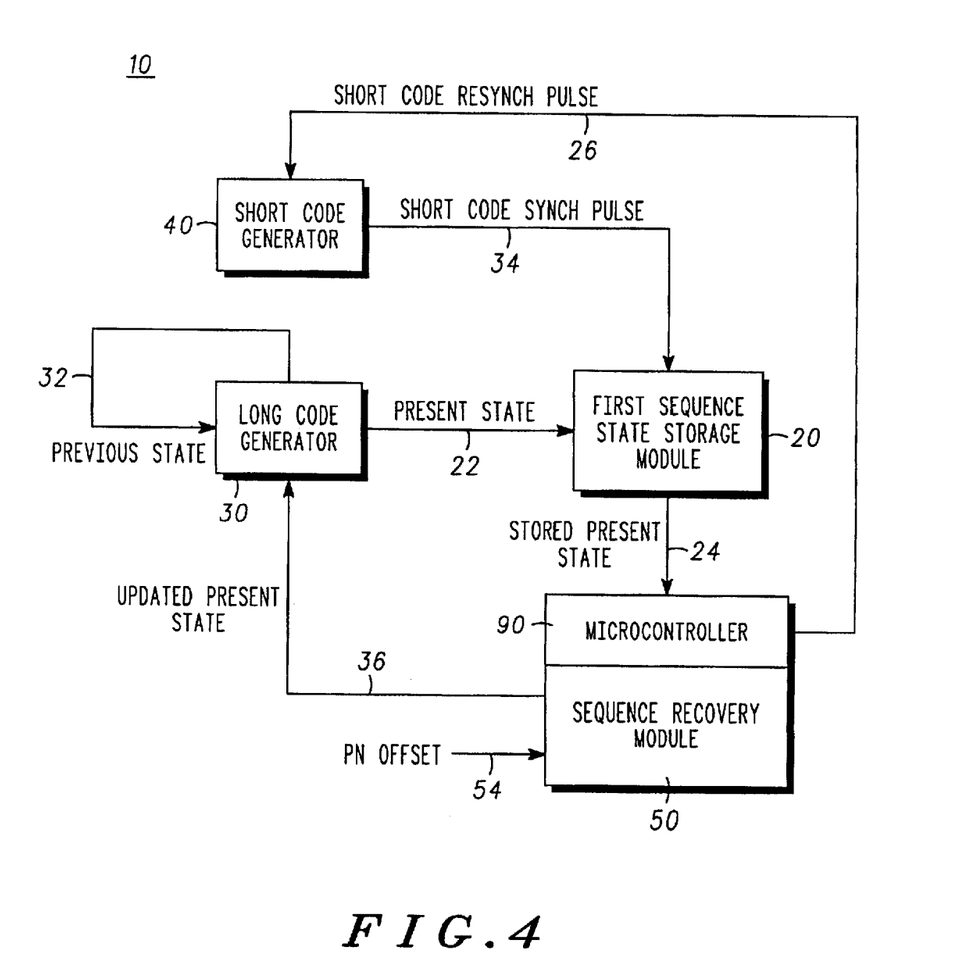
FIG. 4 is a block diagram further illustrating another example portion of the communication unit of FIG. 1.

FIG. 4 shows the communication unit 10 having a short code generator 40, residing within the modem 14, that periodically provides a short code sync pulse 34. The short code generator 40 provides the short code sync pulse 34 whenever a pseudorandom number generator within the short code generator 40 begins its sequence of short code states again. In other words, the short code generator 40 iterates through a sequence of short code states, issues a short code sync pulse 34, and then "rolls over" (i.e., repeats the sequence of short code states again). The short code sync pulse 34 is generated whenever the short code state is equal to a known state.

The short code generator 40 repeats a sequence of short code states much more frequently than the long code generator 30 repeats a sequence of long code states. Accordingly, as one example, the short code generator 40 asserts the short code sync pulse 34 every 26.667 milliseconds. These rollover points of the short code play an important role in CDMA cellular synchronization because it is on specific rollovers that message timing and long code timing is established from.

The first sequence state storage module 20 receives the short code sync pulse 34, and uses the short code sync pulse 34 as a triggering event to store the present state 22 of the long code generator 30 in the first sequence state storage module 20. When the first sequence state storage module 20 receives the short code sync pulse 34, the first sequence state storage module 20 stores the state of the long code generator 30.

Figure 5:
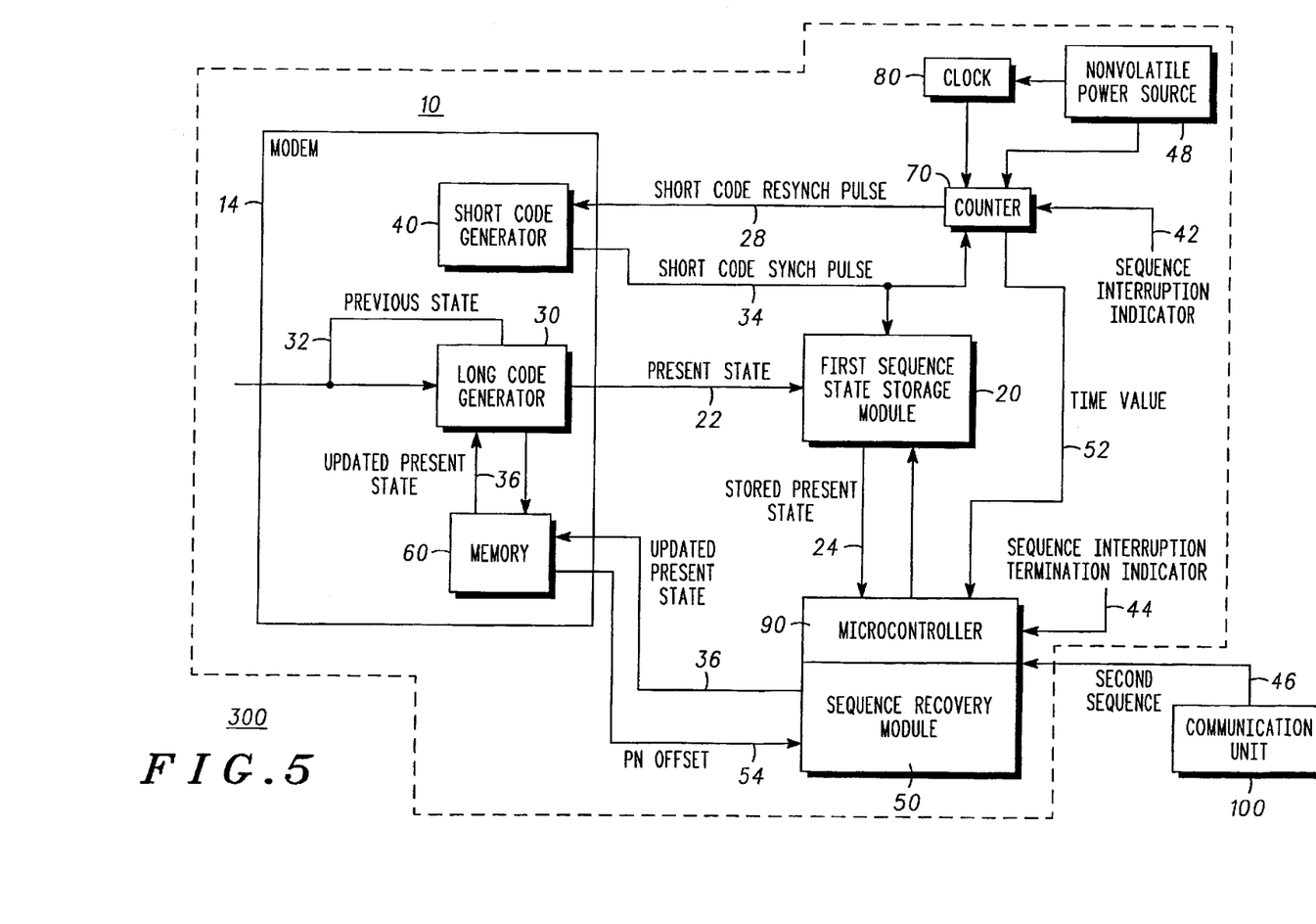
FIG. 5 is a block diagram illustrating an alternative embodiment of a portion of the communication unit of FIG. 1.

The sequence recovery module 50 includes a software routine that calculates the updated present state 36 of the long code generator 30. For example, the software routine uses a pre-programmed function based on an a priori knowledge of the function that the long code generator 30 uses. Such a priori knowledge is, for example, the PN offset 54. Whereas the long code generator 30 generates a present state 22 based upon a previous state 32, the software routine includes a function that generates an updated present state 36 based upon a stored present state 24, an amount of time stored in a counter 70 (FIG. 5), and a PN offset 54. The sequence recovery module 50 then provides the updated present state 36 to the long code generator 30 via the memory 60 (FIG. 5). Accordingly, the function within the software routine allows the long code generator 30 to achieve the updated present state 36 without necessarily achieving any intervening states.

Alternately, the software routine may access a lookup table based on an a priori knowledge of the function that the long code generator 30 uses. Such a priori knowledge is, for example, the PN offset 54. The lookup table may include one index that represents the stored present state 24, and another index that represents the amount of time stored in the counter 70. Using the lookup table, the software routine can obtain the present updated state 36 directly.

When the power is restored and the interruption in power is terminated, the software routine determines what the state of the long code generator 30 would have been had power not been lost. In other words, the updated first sequence state is based upon the previously stored present state, a measure of an elapsed time during which the power was lost, and a priori knowledge of the function that the long code generator 30 uses. Additionally, the routine determines when the next short code sync pulse should occur based on timers internal to the sequence recovery module. Such timers have an alternate power source during a power cut. The routine then provides a short code resync pulse 26 to realign the short code generator 40 and to indicate when the updated present state 36 is valid.

The software routine executes on a processing device such as a microcontroller 90 or other suitable device, residing within the sequence recovery module 50. The microcontroller 90 may be replaced with any processing unit or processing element, including a microprocessor, control logic, switching circuit, or any other suitable mechanism. The microcontroller 90 includes a nonvolatile memory storing instructions that when executed determine the updated present state 36 of the long code generator 30.

The sequence recovery module 50 may alternately be implemented in hardware, for example as a combinational boolean logic function. The previously stored present state is an n-bit number obtained from long code generator 30 before a loss of power. The measure of the elapsed time during which the power was lost is also represented as a binary number from the counter 70. The combinational boolean logic function performs a logic operation to provide the updated first sequence state.

The combinational boolean logic function in one embodiment receives a 41-bit value representing the present state 22 and a 17-bit or 18-bit clock value representing the elapsed time during which the power was lost which is stored in the counter 70. The combinational boolean logic also receives the PN offset 54 from the memory 60. The combinational boolean logic function is a pre-programmed combinational boolean logic function based on an a priori knowledge of the function that the long code generator 30 uses. Such a priori knowledge is, for example, the PN offset 54. Whereas the long code generator 30 generates a present state 22 based upon a previous state 32, the combinational boolean logic function generates an updated present state 36 based upon a stored present state 24, an amount of time stored in a counter 70, and the PN offset 54. The sequence recovery module 50 then provides the updated present state 36 to the long code generator 30 via the memory 60. Accordingly, the combinational boolean logic function allows the long code generator 30 to achieve the updated present state 36 without necessarily achieving any intervening states.

The sequence recovery module 50 may alternately be implemented in hardware, for example as a sequential boolean logic function. The previously stored present state is an n-bit number obtained from long code generator 30 before a loss of power. The measure of the elapsed time during which the power was lost is also represented as a binary number from the counter 70. The sequential boolean logic function performs a logic operation to provide the updated first sequence state.

The sequential boolean logic function in one embodiment receives a 41-bit value representing the present state 22 and an 8-bit clock value representing the elapsed time during which the power was lost which is stored in the counter 70. The sequential boolean logic function is a pre-programmed sequential boolean logic function based on an a priori knowledge of the function that the long code generator 30 uses. Whereas the long code generator 30 generates a present state 22 based upon a previous state 32, the sequential boolean logic function generates an updated present state 36 based upon a stored present state 24, an amount of time stored in a counter 70, and a PN offset 54, possibly achieving one or more intervening states in so doing. The sequential recovery module 50 then provides the updated present state 36 to the long code generator 30 via the memory 60. Accordingly, the sequential boolean logic function allows the long code generator 30 to achieve the updated present state 36 without necessarily achieving many intervening states.

FIG. 5 shows a communication system 300 according to another embodiment of the present invention. The communication system 300 includes a communication unit 100. The communication unit 100 may be the base station or any other suitable communication circuit. Accordingly, a second sequence 46 may be the received signal from the base station. Alternately, the communication unit 100 may be one base station and the remaining components shown in FIG. 5 may belong to another base station. It should be noted that base stations occasionally require synchronization among themselves. Base stations may, for example, temporarily lose power due to a lightning strike, power surge, or brown-out.

In response to the restoration of power to the base station, the base station uses the sequence recovery module to synchronize to another base station. Before interruption and after first sequence recovery, the second sequence 46 is synchronized to the first sequence, in that the long code represented by the present state 22 rolls over during the same bit period as the long code represented by the second sequence 46.

As further shown in FIG. 5, the sequence recovery module 50 obtains a time value 52 from a counter 70. The counter 70 runs off a clock 80 and a nonvolatile power source 48. The counter 70 measures the duration of time since the most recent short code sync pulse 34, and provides the time value 52 indicating this duration of time in units of the clock period of the clock 80. In another embodiment, the counter 70 also receives a sequence interruption indicator 42 indicating a power loss. The sequence interruption indicator 42 resets the counter 70 when power is interrupted. Alternately, the counter 70 operates regardless of whether the power is interrupted.

The counter 70 provides the time value 52 that is reset whenever the state of the first sequence is stored, and that is available even when the first sequence is interrupted since the counter 70 is powered by a nonvolatile power source. Accordingly, the counter 70 gives a reasonable estimate of the amount of time since the most recent pseudorandom number roll over of the short code generator 40. In some wireless devices, the counter 70 that is used to determine whether to generate a wakeup tone in response to the restoration of power can also be used for this purpose.

An interruption to a power supply to the communication unit 10 causes the long code generator 30 to temporarily stop generating and providing the present state 22. Thereafter, a resumption in the power supply asserts a sequence interruption termination indicator 44, indicating that the communication unit 10 is once again receiving power from the power supply, and that the long code generator 30 has again begun generating and providing the present state 22.

Because of the delay during a period of time in which the long code generator 30 did not operate, the long code generator 30 is not immediately synchronized with other signals that may be received by the modem 14. Consequently, the microcontroller 90 calculates the updated present state 36, using the stored present state 24 and the time value 52. By calculating the updated present state 36 from the stored present state 24 and from the time value 52, the sequence recovery module 50 provides a more appropriate starting place for the long code generator 30 to begin.

The memory 60 stores the updated present state 36 from the sequence recovery module 50 until the next short code sync pulse. In response to the next sync pulse, the long code generator 30 reads the updated present state 36 from the memory 60, and for one iteration uses the updated present state 36 instead of the previous state 22. In other words, for the first iteration following the restoration of power to the communication unit 10, the long code generator 30 uses the updated present state 36 instead of the previous state 22.

The recovery of the long code sequence allows the communication unit to reestablish telephone calls almost immediately after power is restored to the wireless device, even before the base station terminates the call. Brief interruptions in power, such as might occur when a physical shock to the wireless device causes battery contacts to lose electrical connection, do not cause the user to lose the telephone call. When power is restored, the user can continue in the same telephone call without having to redial. The user even has enough time to replace a battery in the wireless device without losing the telephone call.

The sequence recovery module 50 controls the power loss call recovery and restores the long code generator 30 and the short code generator 40 within the modem to a synchronized state as though power had never been interrupted. The communications unit includes a memory 60 that temporarily stores the state of the long code at least until the next sync pulse. However, the memory 60 is volatile and is erased in response to loss of power. The first sequence state storage module 20 loads the state of the long code generator in response to a sync pulse; that is, in response to each short code generator roll over.

Figure 6:
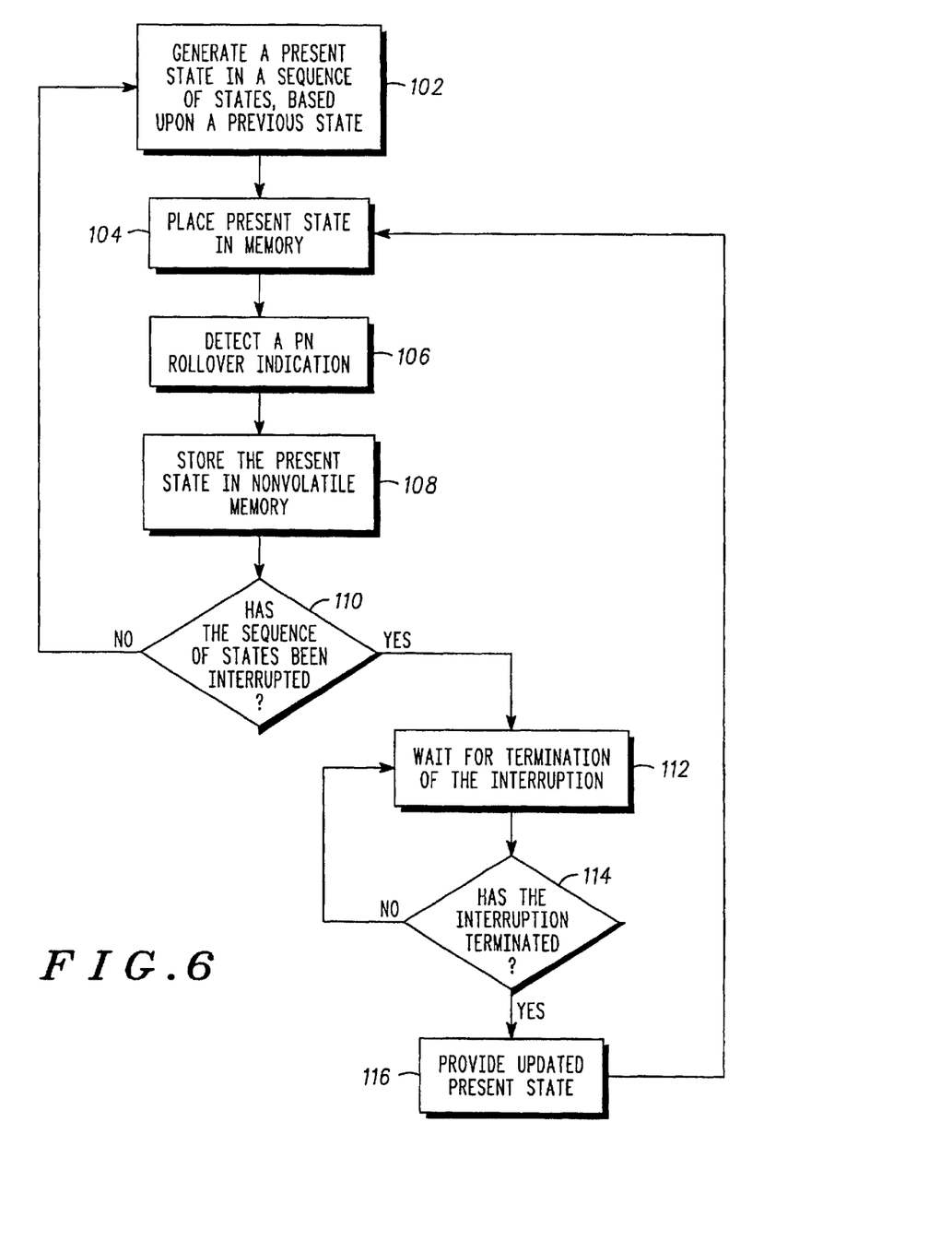
FIG. 6 illustrates a method for recovering synchronization, according to one embodiment of the present invention.

FIG. 6 shows a method for recovering from a temporary loss of power, according to another embodiment of the present invention. The process begins with a response to an initialization of the modem 14, and proceeds to generate a present state step 102. At the generate present state step 102, the long code generator's pseudorandom number generator generates the next long code. At a memory store step 104, the wireless device's modem stores the present long code state in an active, volatile memory. At a pseudo-random rollover step 106, an interrupt-driven step waits until the short code generator 40 produces a short code sync pulse 34, representing a pseudo-random rollover in the short code. At a nonvolatile storing step 108, the wireless device stores the present state of the long code in a nonvolatile storage location.

At an interruption detection step 110, the wireless device repeats steps 102–108 unless the sequence of states has been interrupted since step 110 was last performed. If the wireless devices detects an interruption of the first sequence; then control proceeds to a waiting state 112 that continues indefinitely until the user restores power to the wireless device or until the nonvolatile power source 48 runs out of power.

In addition, if desired, software or hardware also terminates if a timeout condition occurs, regardless of the amount of power remaining in the nonvolatile power source 48.

For example, if desired, the process may terminate at step 112 if the power cut condition has lasted more than nine seconds.

If the user restores power during the appropriate time period, however, control proceeds to an update step 116. At step 116, the wireless device calculates and stores a long code state in the long code generator and in memory. Control returns to step 104. Once power is restored, at step 104 the communication unit 10 reestablishes a telephone call over a system that includes the communication unit 10.

The process of FIG. 6 continues indefinitely. While the communication unit 10 receives power, control proceeds from step 110 to step 102. While the communication unit 10 is deprived of power, control waits at step 112, but does not terminate. Instead, the communication unit 10 proceeds to step 114 in response to termination of the interruption in power. The wireless device receives a second sequence that, before interruption and after first sequence recovery, is synchronized to the first sequence. The wireless device receives the second sequence as a radio signal at a mobile unit. The radio signal includes the second sequence from a communication unit within a stationary base station. Alternately, the radio signal includes the second sequence from a communication unit within a second base station.

As illustrated, the disclosed wireless device provides several advantages over other wireless devices such as are known in the art. For example, the disclosed wireless device allows a user to continue a telephone call following a temporary loss of power as though the wireless device had never lost power. The disclosed wireless device has a more robust response to temporary power cut conditions, such as occur when a battery loses power and a user quickly replaces the powerless battery with a charged battery. In many cases. The disclosed wireless device actually allows the user to recover an ongoing telephone call.

It should be understood that the implementation of other variations and modifications of the invention in its various aspects will be apparent to those of ordinary skill in the art, and that the invention is not limited by the specific embodiments described. For example, the wireless device may be a computer engaged in an Internet session. It is therefore contemplated to cover by the present invention, any and all modifications, variations, or equivalents that fall within the spirit and scope of the basic underlying principles disclosed and claimed herein.

What is claimed is:

1. A communication unit comprising:

a sequence state storage module which periodically stores a present state of a sequence of states;

a sequence recovery module, operably coupled to the sequence state storage module, the sequence recovery module operative to provide an updated present state when an interruption of the sequence of states is terminated, the updated present state being based upon a stored present state and a time value that is reset whenever the present state of the sequence of states is stored, the time value being available even when the sequence of states is interrupted; and a long code generator periodically issuing the present state based upon a previous state, the long code generator being operative to provide the present state to the sequence state storage module.

2. The communication unit of claim 1, wherein the interruption of the sequence of states is a power loss.

3. The communication unit of claim 1, further comprising:

a short code generator periodically issuing a short code sync pulse to the sequence state storage module that is operative to periodically store the present state of the sequence of states in response to the issuance of the short code sync pulse.

4. The communication unit of claim 3, wherein the sequence recovery module is operative to provide the updated present state when the interruption of the sequence of states is terminated, the sequence recovery module being operative to reestablish a telephone call within a system that includes the communication unit.

5. The communication unit of claim 4, wherein the long code generator is operative to generate the sequence of states including the present state, the short code generator is operative to periodically issue the short code sync pulse in response to a short code pseudorandom roll over, and the sequence state storage module is operative to store the present state in response to detecting the short code sync pulse from the short code generator and to store the present state at least until the next sync pulse, the present state overwriting the stored present state.

6. The communication unit of claim 4, further comprising:

a counter operative to count clock pulses of a clock, the counter coupled to be reset in response to detecting one or both of the short code sync pulse from the short code generator and a sequence interruption indicator from a power loss indicator; and a processor, configured to read the stored present state and to provide an updated stored present state to a modem in response to detecting a power recovery from the sequence interruption indicator.

7. A method for recovering a sequence state comprising:

periodically storing a present state of a sequence of states to provide a stored present state, the present state being based upon a previous state;

resetting a time value in response to storing the present state of the sequence of states;

detecting an interruption of the sequence of states, the time value being available even when the sequence of states is interrupted;

after detecting the interruption of the sequence of states, detecting a termination of the interruption of the sequence of states;

providing an updated present state in response to detecting the termination of the interruption of the sequence of states, the updated present state being based upon the stored present state and based upon the time value;

periodically issuing a short code sync pulse; and periodically storing the present state of the sequence of states in response to issuing the short code sync pulse.

8. The method of claim 7, further comprising a step of:

generating a first sequence by periodically generating the present state based upon the previous state.

9. The method of claim 8, wherein:

the step of generating the first sequence includes generating a time-synchronized encryption sequence.

10. The method of claim 7, wherein:

the step of periodically storing the present state of the sequence of states includes storing a CDMA long code.

11. The method of claim 7, wherein the step of providing the updated present state includes reestablishing a telephone call over a system that includes a communication unit.

12. The method of claim 7, further comprising:

generating the sequence of states including the present state, each present state being based upon a previous state;

periodically issuing the short code sync pulse in response to a short code pseudorandom roll over, wherein the step of periodically storing the present state in response to detecting the short code sync pulse at least until the next sync pulse, the present state becoming the stored present state;

in response to detecting the interruption in the sequence of states, counting clock pulses of a clock;

resetting the clock in response to detecting either the short code sync pulse or a sequence interruption indicator from a power loss indicator;

reading the stored present state, in response to detecting a resumption of the sequence of states following the interruption of the sequence of states;

providing the updated present state in response to reading the stored present state;

generating the present state based upon the stored present state in response to providing the updated present state; and reestablishing a telephone call over a system that includes a communication unit.

13. A communication unit comprising:

a sequence state storage module which periodically stores a present state of a sequence of states;

a sequence recovery module, operably coupled to the sequence state storage module, the sequence recovery module operative to provide an updated present state when an interruption of the sequence of states is terminated, the updated present state being based upon the stored present state and a time value that is reset whenever the present state of the sequence of states is stored, the time value being available even when the sequence of states is interrupted; and a first PN code generator periodically issuing the present state based upon a previous state, the PN code generator being operative to provide the present state to the sequence state storage module.

14. The communication unit of claim 13, further comprising:

a second PN code generator periodically issuing a PN code sync pulse to the sequence state storage module that is operative to periodically store the present state of the sequence of the states in response to the issuance of the PN code sync pulse.

15. A communication unit comprising:

a sequence state storage module which periodically stores a present state of a sequence of states;

a sequence recovery module, operably coupled to the sequence state storage module, the sequence recovery module operative to provide an updated present state when an interruption of the sequence of states is terminated, the updated present state being based upon the stored present state and a time value that is reset whenever the present state of the sequence of states is stored, the time value being available even when the sequence of states is interrupted; and a PN code generator periodically issuing a short code sync pulse to the sequence state storage module that is operative to periodically store the present state of the sequence of states in response to the issuance of the short code sync pulse.

16. A communication system comprising:

a first communication unit having a sequence recovery module, operative to retrieve a stored present state of a first sequence of states, wherein the stored present state of the first sequence of states is a time-synchronized encryption sequence, and to provide an updated present state when an interruption of the first sequence of states, wherein the first sequence of states is a CDMA long code, is terminated, the updated present state being based upon the stored present state and based upon a time value that is reset whenever the stored present state of the first sequence of states is stored, the time value being available even when the first sequence of states is interrupted and, wherein the first communication unit comprises a long code generator operative to generate the first sequence of states including a present state, a short code generator operative to periodically issue a short code sync pulse in response to a short code pseudorandom roll over, and a first sequence state storage module operative to store the present state in response to detecting the short code sync pulse from the short code generator and to store the present state at least until a next sync pulse, the present state overwriting the stored present state; and a second communication unit operative to generate a second sequence of states that, is synchronized to the first sequence of states before interruption and is synchronized to the first sequence of states after a first sequence recovery.

17. A method for recovering a sequence state comprising:

periodically storing a present state of a sequence of states to provide a stored present state, the present state being based upon a previous state;

resetting a time value in response to storing the present state of the sequence of states;

detecting an interruption of the sequence of states, the time value being available even when the sequence of states is interrupted;

after detecting the interruption of the sequence of states, detecting a termination of the interruption of the sequence of states;

providing an updated present state in response to detecting the termination of the interruption of the sequence of states, the updated present state being based upon the stored present state and based upon the time value; and receiving a signal that is asserted when a short code state sync pulse is equal to a known state wherein the step of periodically storing occurs in response to the signal being asserted.

* * * * *